(12) United States Patent
Pan et al.

(10) Patent No.: US 7,498,542 B2
(45) Date of Patent: Mar. 3, 2009

(54) CONTROL METHOD AND SYSTEM FOR A TRACKLESS AUTONOMOUS CRAWLING ALL-POSITION ARC WELDING ROBOT WITH WHEELS AND PERMANENT MAGNET CATERPILLAR BELTS

(76) Inventors: Jiluan Pan, 7-1-602 Heqing Residential Area, Tsinghua Univ., Beijing 100084 (CN); Bingyi Yan, 4-2-101 Southwest Residential Area, Tsinghua Univ., Beijing 100084 (CN); Lisheng Gao, 14-3-102 West Residential Area, Tsinghua Univ., Beijing 100084 (CN); Hua Zhang, Electro-mechanical Institute, Nanchang Univ., Jiangxi Province, Nanchang City 330029 (CN); Qinying Lu, 4-2-101 Southwest Residential Area, Tsinghua Univ., Beijing 100084 (CN)

( * ) Notice: Subject to any disclaimer, the term of this patent is extended or adjusted under 35 U.S.C. 154(b) by 261 days.

(21) Appl. No.: 11/311,521

(22) Filed: Dec. 19, 2005

(65) Prior Publication Data

US 2006/0144835 A1      Jul. 6, 2006

(30) Foreign Application Priority Data

Aug. 19, 2003   (CN)   ................................ 03 1 53663

(51) Int. Cl.
*B23K 9/127* (2006.01)
*B23K 9/12* (2006.01)

(52) U.S. Cl. .............................. 219/124.1; 219/124.31; 219/124.34; 219/86.32

(58) Field of Classification Search ........................ None
See application file for complete search history.

(56) References Cited

U.S. PATENT DOCUMENTS

| 4,636,610 | A | * | 1/1987 | Kamo et al. | ........... | 219/124.02 |
| 4,675,502 | A | * | 6/1987 | Haefner et al. | ......... | 219/124.34 |
| 4,954,762 | A | * | 9/1990 | Miyake et al. | ......... | 318/568.19 |

(Continued)

FOREIGN PATENT DOCUMENTS

CN          2405719         11/2000

(Continued)

OTHER PUBLICATIONS

"Caterpillar Belts Type Intellectual Arc-welding Robot System Development," (Zhanghua etc.), Jan. 30, 2002, Technology and Application of Robot, vol. 1, 2002.

(Continued)

*Primary Examiner*—Kiley Stoner
*Assistant Examiner*—Devang Patel
(74) *Attorney, Agent, or Firm*—Marshall, Gerstein, Borun LLP (57) ABSTRACT

A method and system are provided for a trackless autonomous crawling all-position arc welding robot with wheels and permanent magnet caterpillar belts. A sensor detects a welding seam position and transmits the position to a tracking controller. The tracking controller sends instructions to a welding torch which may be moved in generally horizontal and vertical directions based upon the instructions. Additionally, a crawler drive controller receives the welding seam position and sends a control signal to an AC servomotor drive that positions the crawler based on the control signal.

7 Claims, 7 Drawing Sheets

U.S. PATENT DOCUMENTS

| | | | | |
|---|---|---|---|---|
| 4,965,431 | A | * | 10/1990 | Monteleone ................. 219/123 |
| 5,130,515 | A | * | 7/1992 | Toyoda et al. .......... 219/125.12 |
| 6,430,472 | B1 | * | 8/2002 | Boillot et al. ................ 700/245 |
| 6,492,618 | B1 | * | 12/2002 | Flood et al. ............ 219/125.11 |

FOREIGN PATENT DOCUMENTS

| | | | | |
|---|---|---|---|---|
| CN | 2550116 | | | 5/2003 |
| CN | 2550116 | U | * | 5/2003 |
| DE | 218292 | A | * | 2/1985 |
| EP | 377755 | A1 | * | 7/1990 |
| JP | 1157777 | | | 6/1989 |
| JP | 11248094 | A | * | 9/1999 |
| JP | 2002096169 | | | 3/2002 |

OTHER PUBLICATIONS

International Search Report, Form PCT/ISA/210 in Application No. PCT/CN2004/000336.

* cited by examiner

CONTROL METHOD AND SYSTEM FOR A TRACKLESS AUTONOMOUS CRAWLING ALL-POSITION ARC WELDING ROBOT WITH WHEELS AND PERMANENT MAGNET CATERPILLAR BELTS

FIELD OF THE INVENTION

The control method and system for trackless autonomous crawling all-position arc welding robot with wheels and permanent magnet caterpillar belts disclosed in the present invention relates to an arc welding robot, particularly to an arc welding robot for welding of large and huge structures on site in order to obtain high quality and high efficiency.

BACKGROUND OF THE INVENTION

As the continuous development of industries, automatic welding machines, welding robots and their control methods have been developed rapidly in order to meet the demands of continuous increase of workload and requirement of welding quality. But up to the moment there is no arc welding robot which can be used for welding of large structures on site. Speaking generally there are mainly two methods for realizing automation of welding at the moment:

1) Arm Type Industrial Arc Welding Robot

This type of robot normally has six and half axis of freedom, which cooperates with the manipulator having three or more axis of freedom. The robot automatically tracks the seam and performs the welding by means of off-line programming or teaching.

This type of robot has limitations in its dimension, it can be used only in workshop for welding of small work-piece or small size structure such as small boat or carriage.

2) Track Crawling Type Partially Intelligent Automatic Arc Welding Machine

This type of automatic welding machine is capable of carrying out the welding of large structures by mainly placing a carriage on track, wherein the carriage has welding torch and performs the welding along the track. There exist problems in this type of automatic welding machine: it is difficult for the profile of the track to be completely the same as those of the work-piece to be welded, although the tracks are divided into rigid and flexible types; despite that the tracks are substantially installed along the welding seam, the tracks are not often completely in parallel with the welding seam, especially when the work-piece has a curved seam and different types of joint; although in some cases it is equipped with automatic tracking mechanism, the tracking capabilities are limited, because the tracks are limited and thereby the range of tracking is very small. In addition, the installation of the tracks is time-consuming and costly, wherein the installation of the tracks often takes half of the workload and the cost of the tracks accounts for more than one third of the total investment in the equipment.

SUMMARY OF THE INVENTION

The objective of the present invention is to provide a new-type control system for a trackless autonomous crawling all-position arc welding robot with wheels and permanent magnet caterpillar belts to overcome the defects in the prior described arc welding robot and track crawling type automatic arc welding machine and to perform the welding of large structures on site with high precision, high quality and high efficiency. With the welding equipment of the system, the welding machine can be timely and autonomously controlled and the welding seam can be tracked accurately, without the installation of any tracks or guiding means, nor the need of complicated programming or teaching. Furthermore, the range of the tracking is not limited and therefore the welding of large structures can be performed on site.

The objective of the present invention shall be carried out using the technical schemes as follows:

A control method for a trackless autonomous crawling all-position arc welding robot with wheels and permanent magnet caterpillar belts, said method comprising the steps of:

a. detecting the position image signal of the welding seam using laser CCD sensor 14;

b. transmitting said position image signal to tracking controller after signal processing;

c. sending out instructions by the tracking controller upon said position image signal;

d. having the welding torch moved in vertical and horizontal directions upon said instructions via bi-directional driving mechanism and cross slide;

e. transmitting also the image signal in Step a to crawler drive controller after signal processing and compensation;

f. sending out a control signal by the crawler drive controller upon said image signal after processing;

g. driving two permanent magnet caterpillar belts and thereby crawler to move upon said control signal via AC servomotor drive.

A serial-parallel control method is also provided for the cross slide and crawler:

sending out a horizontal slide shift signal as the horizontal slide in the cross slide in Step d moves;

transmitting simultaneously the horizontal slide shift signal after signal operating and processing, together with the signal from the tracking controller, to the crawler drive controller;

the crawler drive controller sends out instructions after calculation to drive respectively the two permanent magnet caterpillar belts and thereby crawler to turn via AC servomotor drive;

welding current and voltage feedback signals are transmitted to welding power supply controller, which adaptively controls welding power supply upon the current and voltage feedback signals;

depending upon the specific conditions of the welding seam, weaving controller sends out control signals to select different amplitude of weaving, frequency of weaving, pause of weaving and time of weaving of the welding torch and the control signals make the welding torch to perform prescribed weaving via the weaving drive of welding torch;

programmable logic controller (abbreviated as PLC in the following text) can coordinate said cross slide and the crawler in combined tracking control, welding power supply control, welding torch weaving control and welding program control, to adapt to different positions and joint types of the work-piece;

the manual controller connected to the PLC controls the welding parameters needing adjusting or manual intervening during the welding.

The magnetic force of magnet bodies of caterpillar belts of the crawler are controlled by magnetic circuit switch, when it is switched on, the magnetic circuit of the permanent magnet body passes through the work-piece, attractive force exists between the magnetic body and work-piece, wherein load carrying capacity of the crawler can be up to 120 kg on the vertical plan; when the magnetic circuit switch is switched off, the magnetic circuit of the permanent magnet body is shorted inside its own body, therefore no attractive force exits between the magnetic body and work-piece, thereby the crawler can be easily removed from the work-piece.

The moving speeds of the two permanent magnet caterpillar belts of the crawler are respectively controlled by the crawler drive controller and two AC servomotor drives; there is a turning and safety device engaged with the permanent magnet caterpillar belts, the crawler can be turned to the left or right, even 360° around its own center freely, stably and safely, when different moving speed signals are given to left and right caterpillar belts.

A control system for a trackless autonomous crawling all-position arc welding robot with wheels and permanent magnet caterpillar belts is also provided in the present invention, said system comprising: laser CCD sensor, tracking controller, bi-directional drive mechanism and cross slide, welding torch, crawler drive controller, AC servomotor drive, permanent magnet caterpillar belts, welding power supply controller, weaving controller and comprehensive programmable controller, wherein:

detecting the position image signal of the welding seam using the laser CCD sensor;

transmitting said position image signal to the tracking controller after signal processing;

sending out instructions by the tracking controller upon said position image signal;

having the welding torch moved in vertical and horizontal direction upon said instructions via the bi-directional drive mechanism and cross slide;

transmitting also the position image signal to crawler drive controller after signal processing and compensation;

sending out a control signal by the crawler drive controller upon said position image signal after calculation;

driving two permanent magnet caterpillar belts and thereby the crawler to move upon said control signal via the AC servomotor drive, such a movement and that of the cross slide enable the welding torch to track the welding seam precisely.

A serial-parallel control method for the cross slide and crawler is also provided in the system:

sending out a horizontal slide shift signal as the horizontal slide in the cross slide moves;

transmitting simultaneously the horizontal slide shift signal, after signal operating and processing, to the crawler drive controller, together with said position image signal;

the crawler drive controller sends out instructions after calculation to drive respectively the two permanent magnet caterpillar belts and thereby the crawler to turn timely via AC servomotor drive;

welding current and voltage feedback signals are transmitted to welding power supply controller, and the welding power supply controller adaptively controls welding power supply upon the current and voltage feedback signals;

depending upon the specific conditions of the welding seam, weaving controller sends out control signals to select different amplitude of weaving, different frequency of weaving, pause and time of weaving of the welding torch; the control signals make the welding torch to perform prescribed weaving via the weaving drive of welding torch;

programmable logic controller can coordinate said cross slide and the crawler movement control, welding power supply control, welding torch weaving control and welding program control, to adapt them to different positions and types of joint of the work-piece;

the manual controller connected to the programmable controller controls the welding parameters needing adjusting or manual intervening during the welding;

the permanent magnet caterpillar belt comprises: chain, permanent magnet bodies, magnetic circuit switch and supporting wheel, wherein the gap between the two chains is mounted with series of permanent magnet bodies, on each of which there is a magnetic circuit switch;

the magnetic attractive force of the permanent magnet caterpillar belts of the crawler are controlled by way of: changing magnetic circuit by magnetic circuit switch, when the switch is turned to a vertical position the magnetic circuit of the permanent magnetic bodies passing through the work-piece, there is attractive force between the work-piece and the crawler, wherein the load carrying capacity of the crawler can be up to 120 kg, when the magnetic circuit switch is turned to a horizontal position and the magnetic circuit of the permanent magnetic bodies is shorted inside itself, there is no more attractive force between the crawler and work-piece thereby the crawler can be easily removed from the work-piece;

the moving speeds of the two permanent magnet caterpillar belts of the crawler are respectively controlled by the crawler drive controller and two AC servomotor drives, when giving different speeds to left and right caterpillar belt it turns to left or right, with turning and safety device engaged with the permanent magnet caterpillar belts, the crawler can turn freely, stably and safely, even turn 360° around its own center.

The control system for a trackless autonomous crawling all-position arc welding robot with wheels and permanent magnet caterpillar belts provided in the present invention has the advantages over normal industrial arc welding robot and track-type automatic welding machine of the prior art as follows:

1) it is able to perform all-position welding of large or huge structures, including horizontal and vertical position of welding as well as all-position welding, this cannot be done by the prior art arm type industrial arc welding robot or track crawling type partially intelligent automatic arc welding machine;

2) since advanced system for automatic seam tracking is utilized, welding with high quality can be ensured, wherein the tracking precision of the seam can be up to ±0.2~0.3 mm and torch height control within ±0.5, while the range of tracking is not limited;

3) as there is no need of the installation of tracks or any type of guiding means, the subsidiary time in welding is obviously reduced and the welding is performed according to the optimal parameters all the time, thereby the defects and repair time in welding seams are reduced, the work efficiency is greatly promoted as well;

4) as the identification of the position and joint type of the welding seam is completely adaptive and autonomous with no need of programming, teaching or manual monitoring, the operational degree of difficulty is decreased and operators are thoroughly set free.

DETAILED DESCRIPTION OF THE INVENTION

A control system for a trackless autonomous crawling all-position arc welding robot with wheels and permanent magnet caterpillar belts provided in the present invention is described herein with reference to the drawings.

Figure 1:
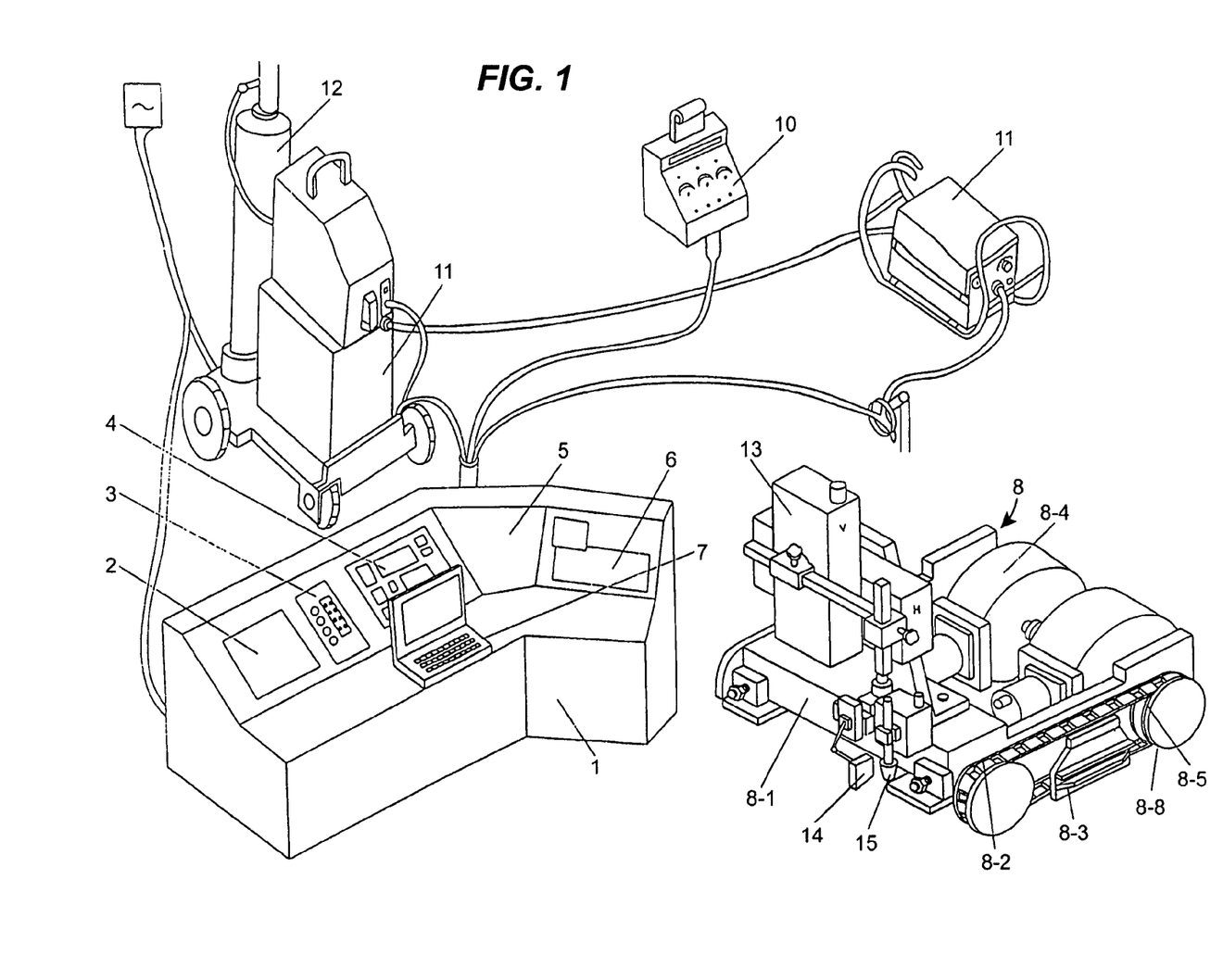
FIG. 1 is a schematic diagram of the equipment used in the control system for a trackless autonomous crawling all-position arc welding robot with wheels and permanent magnet caterpillar belts provided in the present invention.

Reference is made first to FIG. 1 to describe the main equipment used in the control system of the present invention. On the host control chamber 1, there are mounted a PLC controller 2, a weaving controller 3, a power supply controller 4, a crawler drive controller 5, a tracking controller 6, and a PC 7. Additionally included are a crawler 8, a wire feeder 9, a manual controller 10, a welding power supply 11 and a gas cylinder 12.

The crawler 8 includes a cross slide 13, a laser CCD sensor 14 and a welding torch 15, wherein the cross slide 13 includes a V slide and a H slide (H refers to horizontal and V refers to vertical).

The crawler 8 has a main body 8-1, one or more permanent magnet caterpillar belts 8-2, a turning and safety device 8-3, a guide 8-6 (See FIG. 7) and a T-shaped block 8-7 (See FIG. 7), an AC servomotor drive 8-4, chain wheels 8-5 and one or more supporting wheels 8-8.

Figure 2:
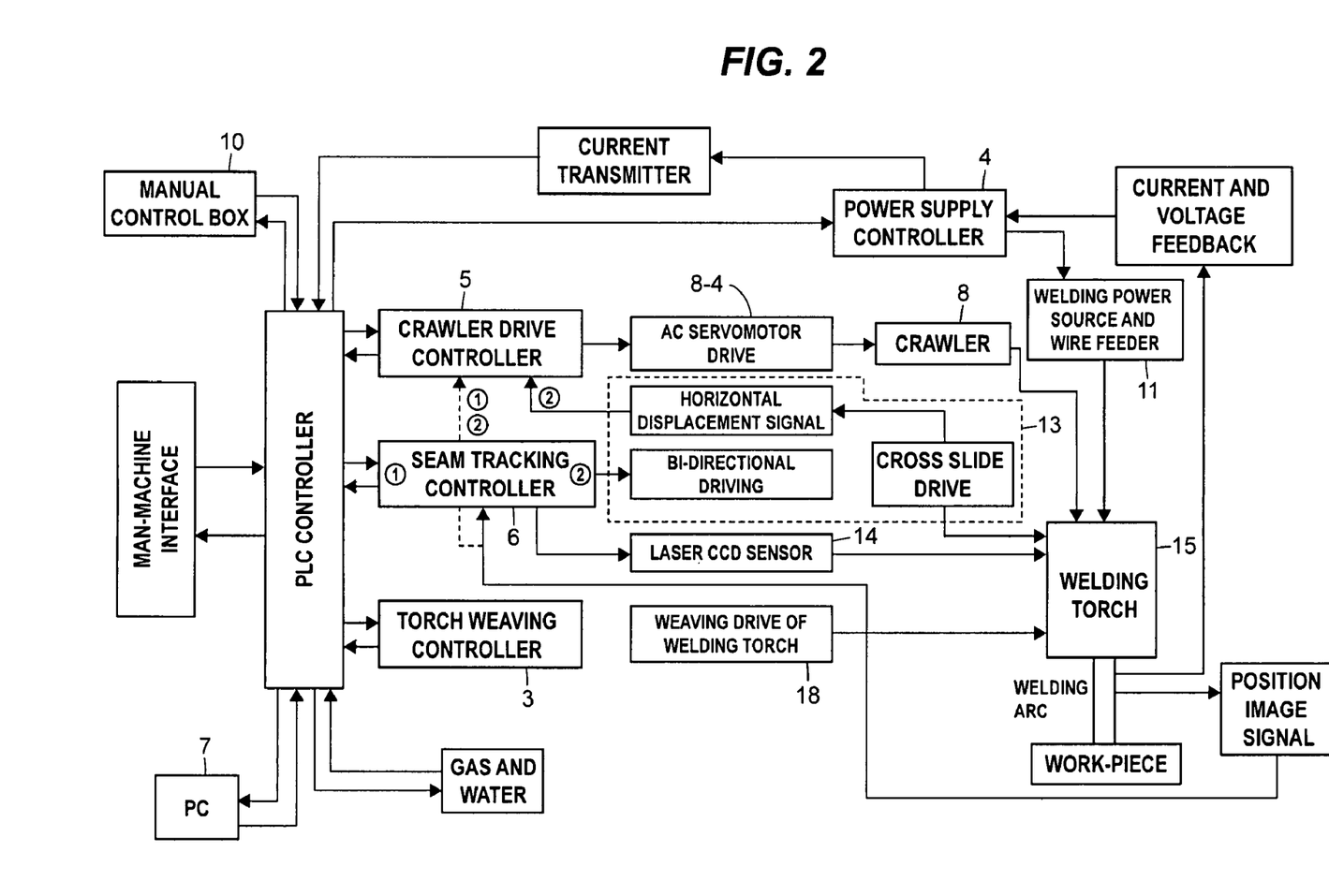
FIG. 2 is a block diagram of the control system for the trackless autonomous crawling all-position arc welding robot with wheels and permanent magnet caterpillar belts provided in the present invention of FIG. 1.

The process for the parallel control method of the present invention shall be described herein with reference to the block diagram in FIG. 2.

The welding torch 15, equipped with the laser CCD sensor 14, is fixed on the cross slide 13 of the crawler 8. The laser CCD sensor 14 transmits to the tracking controller 6 the position image signal of the welding joint of the work-piece (including type of joint, shape of groove, size of clearance), and the tracking controller 6 sends out instructions to have the V slide and H slide of the cross slide 13 moved via bi-directional drive control (e.g., vertically and horizontally). The position image signal of the welding seam is also transmitted to the crawler drive controller 5, and the crawler drive controller 5 sends out instructions to drive the crawler 8 via the AC servomotor drive 8-4. The tracking controller 6 and the crawler controller 5 are coordinated by the PLC controller. What is described above is the process for the parallel control of the cross slide 13 and the crawler 8, the signal transmission line of which marked with ① is shown in the block diagram of FIG. 2.

There is also a process for the serial-parallel control of the cross slide 13 and the crawler 8.

The image signal is transmitted to the tracking controller 6, and the tracking controller 6 sends out instructions via bi-directional drive control to move the cross slide 13 in vertical and horizontal directions. The shift signal of the horizontal slide is transmitted to the crawler drive controller 5, then the crawler drive controller 5 sends out instructions, which, together with the signal sent out by the tracking controller 6, make the crawler 8 move via the AC servomotor drive 8-4. This is a serial-parallel control of the cross slide 13 and the crawler 8, the signal transmission line is marked with ② is shown in the block diagram of FIG. 2.

During a welding operation, current and voltage feedback are transmitted to the welding power supply controller 4 to control the welding power supply 11.

Depending upon the specific conditions of the welding seam, the weaving controller 3 sends out control signals to select different amplitude of weaving, frequency of weaving, pause and time of weaving of the welding torch 15, the control signals make the welding torch 15 move via the weaving drive 18; to simulate a "technique" of an operator.

The programmable logic controller (PLC) coordinates the operations between the tracking control 6, power supply control 4 and welding torch weaving control 3, as well as the welding process control.

The programmable logic controller also controls the water and gas supply for the welding torch 15 and the laser CCD sensor 14.

The manual controller 10 is connected to the programmable logic controller and controls the welding parameters needing adjusting or manually intervenes during the welding.

Operators operate the controllers and secondary controllers through a man-machine interface.

Figure 3:
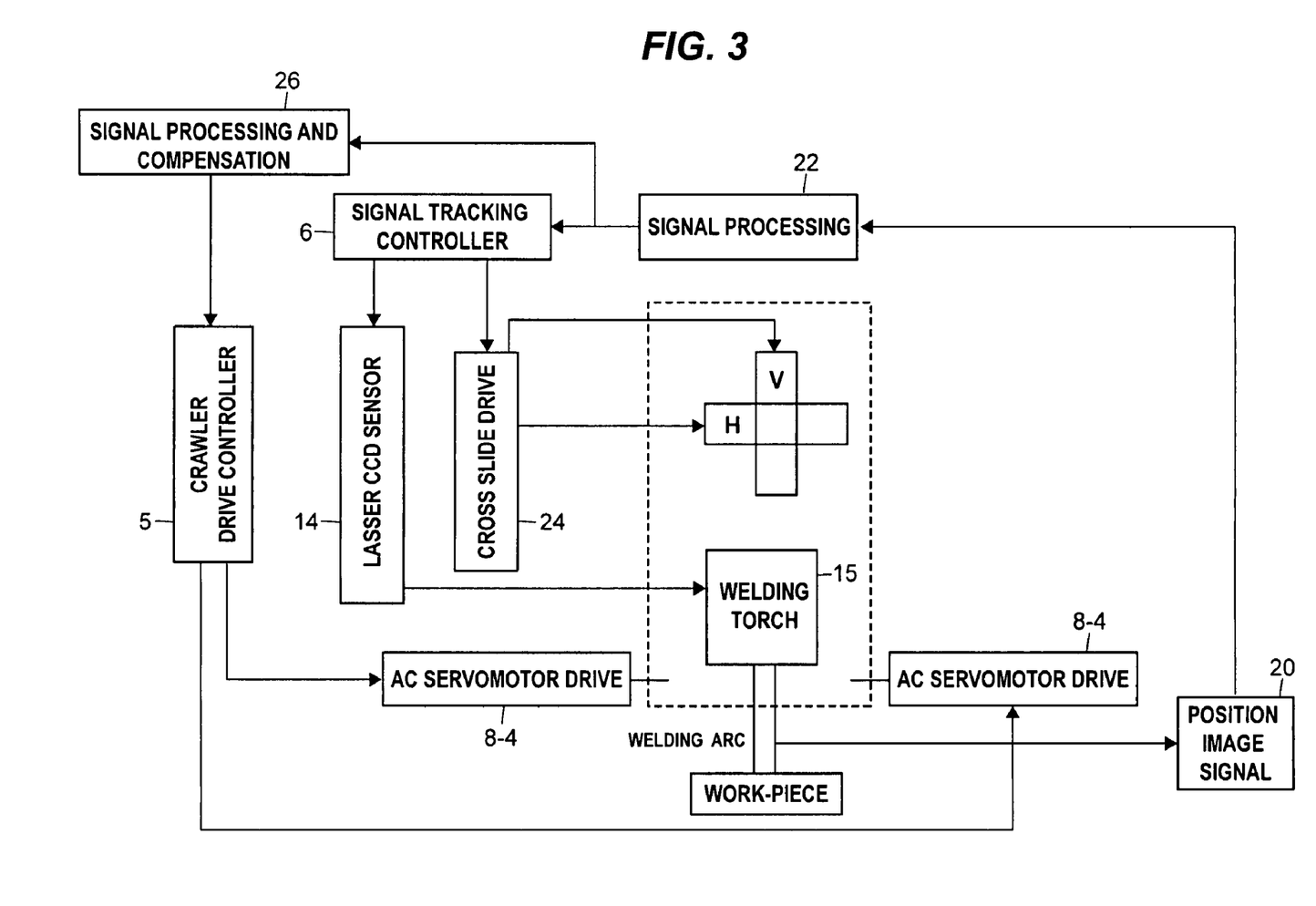
FIG. 3 is a block diagram of the parallel control of a cross slide and a crawler.
Figure 4:
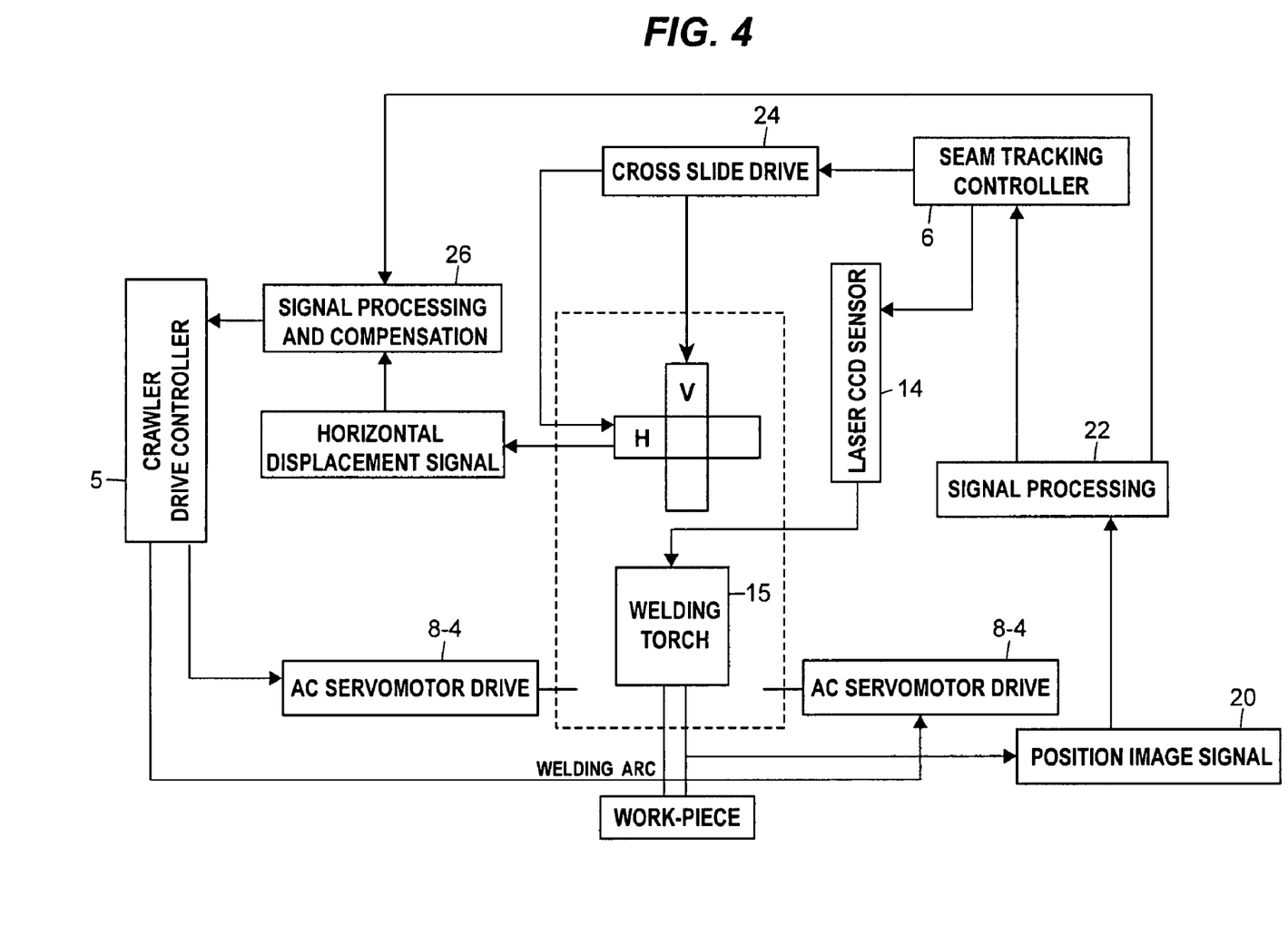
FIG. 4 is a block diagram of a serial-parallel control of the cross slide and the crawler of FIG. 3.

Two control methods are described herein with reference to FIG. 3 and FIG. 4, wherein the cross slide 13 and the crawler 8 (FIG. 2) are coordinately controlled.

A parallel control method for the cross slide 13 and the crawler 8 is shown in FIG. 3 in detail.

The position image signal 20 of the welding seam detected by the laser CCD sensor 14 is transmitted to the tracking controller 6 after signal processing 22, then the tracking controller 6 sends out instructions to have the cross slide 13 on the crawler 8 moved in two directions (the vertical and horizontal directions) via the cross slide drive 24; said position image signal 20 is also transmitted to the crawler drive controller 5 after signal processing and compensation 26 and the crawler drive controller 5 sends out instructions to drive respectively the left and right permanent magnet caterpillar belts 8-2 of the crawler 8 via the two AC servomotor drives 8-4. Said signal improves the dynamic performance of the system. The position of the welding torch relative to the welding seams is held properly after said two types of movement are synthesized by the PLC.

Serial-parallel control method for the cross slide 13 and the crawler 8 is shown in FIG. 4 in detail.

Said position image signal 20 is transmitted to the tracking controller 6 after signal processing 22, then the tracking controller 6 sends out instructions to have the cross slide 13 on the crawler 8 (FIG. 1) moved in vertical and horizontal directions via the cross slide drive 24. The shift signal of the horizontal slide along the sliding frame, i.e. the horizontal shift signal, is also transmitted to the crawler drive controller 5, then the crawler drive controller 5, depending upon the two signals of the tracking controller and the horizontal slide, sends out instructions to drive respectively the two permanent magnet caterpillar belts 8-2 of the crawler 8 (FIG. 1) via the two AC servomotor drives 8-4.

It can be seen from the control process above that such a control method is a serial-parallel control of the cross slide and the crawler.

Figure 5:
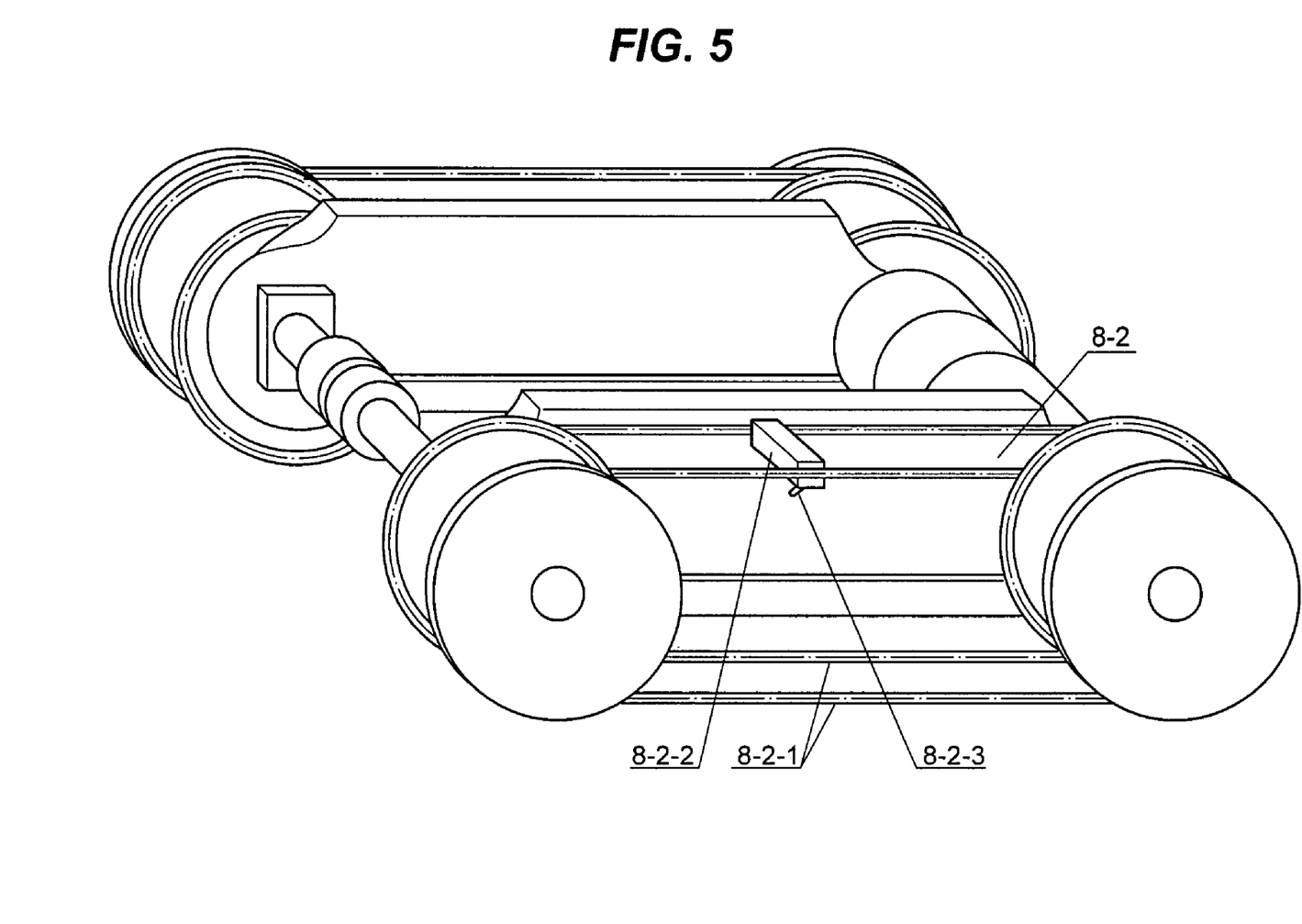
FIG. 5 is a perspective view of wheels and permanent magnet caterpillar belts of the crawler.

FIG. 5 shows the structure of the permanent magnet caterpillar belts 8-2 of the crawler 8. On each side of the crawler 8 (FIG. 1) there is a permanent magnet caterpillar belt 8-2, and each of the permanent magnet caterpillar belts 8-2 is mainly comprised of two chains 8-2-1, permanent magnet bodies 8-2-2, magnetic circuit switches 8-2-3 and supporting wheels 8-8 (FIG. 1), the gap between the two chains 8-2-1 is mounted with permanent magnet bodies 8-2-2, on each of which there is a magnetic circuit switch 8-2-3.

Figure 6:
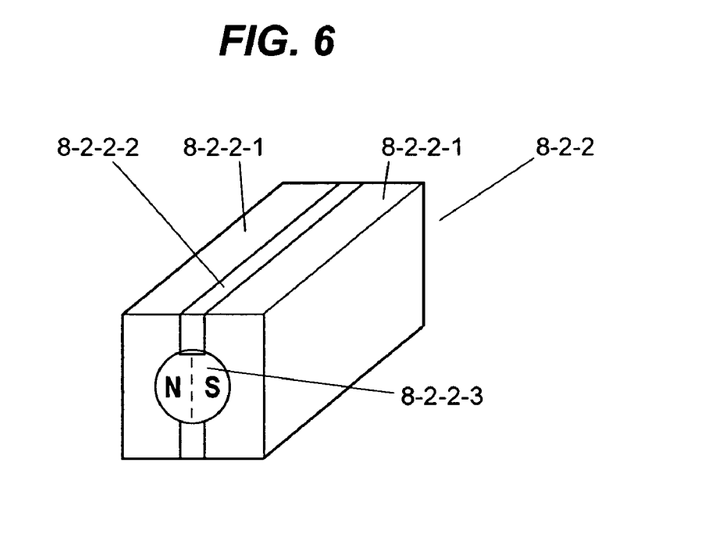
FIG. 6 is a perspective view of the permanent magnetic block mounted on the caterpillar belts of the crawler.

Now the principle of controllable magnetic circuit of the permanent magnet caterpillar belts 8-2 shall be described with reference to FIG. 6. Each of the permanent magnet bodies 8-2-2 comprises two pieces of soft magnetic materials 8-2-2-1 and one piece of intermediate nonmagnetic materials 8-2-2-2. At the central part of the permanent magnet body 8-2-2, there is a cylindrical permanent magnet 8-2-2-3 passing through its total length. The magnetic circuit switch 8-2-3 is connected with the cylindrical permanent magnet 8-2-2-3. The cylindrical permanent magnet 8-2-2-3 comprises two semi-cylindrical parts along its central face and the two semi-cylindrical parts are made with permanent magnet powder, with one semi-cylindrical part being N-pole and the opposite semi-cylindrical part being S-pole. Thus, when the magnetic circuit switch 8-2-3 is turned and the cylindrical permanent magnet 8-2-2-3 stays at the position shown in FIG. 6, the magnetic lines of two semi-cylindrical parts of the permanent magnet body are directed outside of the permanent magnet body 8-2-2 and passing through the work-piece, as the magnetic lines inside the magnetic body are blocked by the nonmagnetic materials 8-2-2-2. Therefore, the crawler 8 is firmly attached to the work-piece. As the magnetic circuit switch 8-2-3 is turned and the cylindrical permanent magnet 8-2-2-3 is turned 90 relative to its position shown in FIG. 6, the magnetic lines generated between the two semi-cylindrical parts of the permanent magnet body pass through the soft magnetic materials 8-2-2-1 and thus, no magnetic line is directed out. With no magnetic attraction on the work-piece, the crawler 8 may be easily removed from the work-piece.

Figure 7:
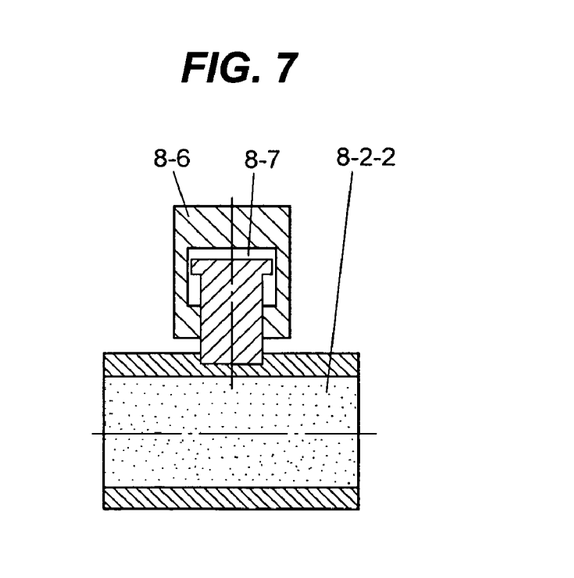
FIG. 7 is a cross-sectional view of a safety and guide device of the permanent magnet caterpillar belts of the crawler.

Referring to FIGS. 1, 5 and 7, turning on the magnetic circuit switch 8-2-3 enables permanent magnet caterpillar belts 8-2 of the crawler 8 to generate powerful magnetic attraction in operation and ensures the magnetic attraction of the crawler 8 to the work-piece, and a load of more than 120 kg can be carried by the crawler 8 at vertical welding position. When not in operation, the crawler 8 can be easily removed from the work-piece by switching off the magnetic circuit of the permanent magnet caterpillar belts 8-2 through the work-piece. The diameter of the supporting wheel 8-8 being greater than that of the chain wheel 8-5, thus the permanent magnetic caterpillar belts shall have flexibility that enables it to adapt to work-pieces with various curvatures and keep in firm contact with the work-piece.

The moving speeds of the two permanent magnet caterpillar belts 8-2 of the crawler 8 are respectively controlled by the crawler drive controller 5 and two AC servomotor drives 8-4. There is a turning and safety device 8-3 fixed with the main body 8-1 (FIG. 1) and engaged with the permanent magnet caterpillar belts 8-2, giving different speeds for the left and right belts, the crawler 8 can turn freely, stably and safely. The structure of the turning and safety device 8-3 is shown in FIG. 7. On the upper part of each of the permanent magnet body 8-2-2 there is a T-shaped block 8-7. The T-shaped block 8-7 is integral with the permanent magnet body 8-2-2 and is inserted into the T-shaped guide 8-6 which is fixed with the main body 8-1, it can hold the crawl body 8-1 rigidly with the permanent magnetic blocks in case accidental break of the chain happens.

In the turning of the crawler 8, although the crawling body 8-1 turns by the difference of the speeds of the two permanent magnet caterpillar belts 8-2, the permanent magnet body 8-2-2 mounted on the permanent magnet caterpillar belts 8-2 may not turn concurrently with the crawler 8 as it is attracted to the work-piece by the magnetic force. In that case the chain wheels 8-5 may not well engage with the two chains 8-2-1, and sometimes the two chains 8-2-1 may spring on the tops of teeth of the chain wheels 8-5. All these may cause the crawler 8 may not work properly. For this reason a turning and safety device is included.

With the use of turning and safety device 8-3 in the turning of the crawler 8, the permanent magnet bodies 8-2-2 will, through the guide 8-6 and T-shaped block 8-7, turn together with the crawling body 8-1, thus the interference of the permanent magnet body 8-2-2 is removed and the chain wheels 8-5 may well engage with the two chains 8-2-1, thereby the crawler 8 may track and turn freely, stably and safely. If an accidental break occurs in the chains 8-2-1 during the operation of the crawler 8 at a higher position, the crawler 8 will not fall down, as the permanent magnet body 8-2-2 is attached to the work-piece and connected to the crawler 8 through the guide 8-6 and the turning and safety device 8-3.

EXAMPLES

Welding structures with various shapes (ship bodies, spherical tanks and petroleum containers with vertical walls, etc.) may be categorized into several typical joints and welding positions, such as T-joint, butt joint, lap joint, horizontal position, vertical position, flat position etc. The above-mentioned positions and joints may be welded with high efficiency and high quality using the control method proposed in the present invention, thus large or huge structures may be well welded on site.

I. Welding of Curved Seam with T-Joint

Figure 8:
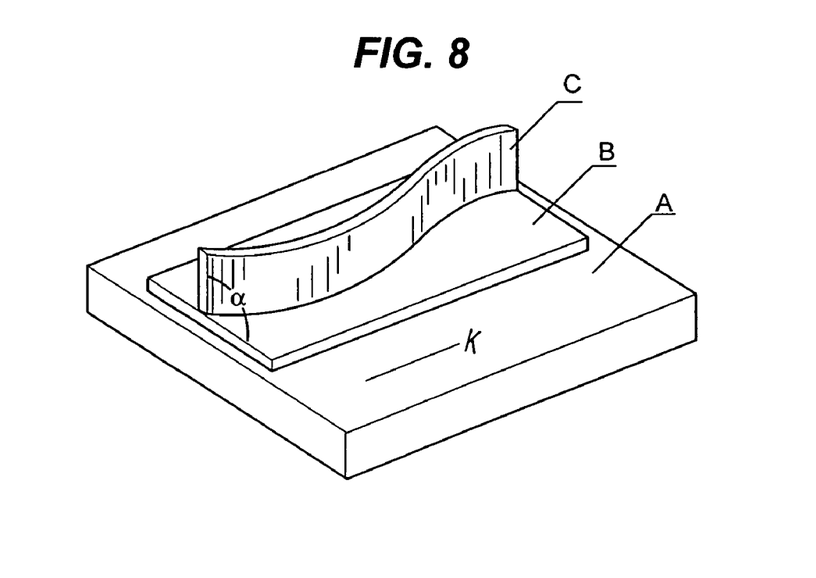
FIG. 8 is a perspective view of a T-joint welding sample used for testing the control system of the present invention.

The work-piece is shown in FIG. 8, wherein on the steel plate A a T-joint sample comprising flat plate B and curved vertical plate C with an angle of $\alpha$ of approximately 90 degrees there between is fixed, the angle may be changed from approximately 50 to approximately 130 degrees. Both the plates may be low-carbon steel and the gap of the joint is approximately 1.5 mm.

Laser CCD sensor 14 is disposed on an angular bisector of the T-joint and the crawler 8 is disposed approximately parallel (with an angle less than approximately 15 degrees) with the seam to be welded.

The position image signal of the T-joint groove of the sample detected by the laser CCD sensor 14 is transmitted to the track controller 6 and PLC controller. The PLC controller sends out instructions to the crawler 8 and cross slide 13 according to the program based on a nonlinear control system. Arrow K represents the moving direction of the crawler 8.

Adaptive MIG welding may be utilized in the operation, wherein the protective gas is Ar+approximately 20% $CO_2$, the flow rate of gas is approximately 10-15 liters/min., the diameter of the welding wire is approximately 1.2 mm, the welding speed is approximately 30 cm/min. and the welding current is approximately 200A.

II. Horizontal Welding and Vertical Welding

Figure 9:
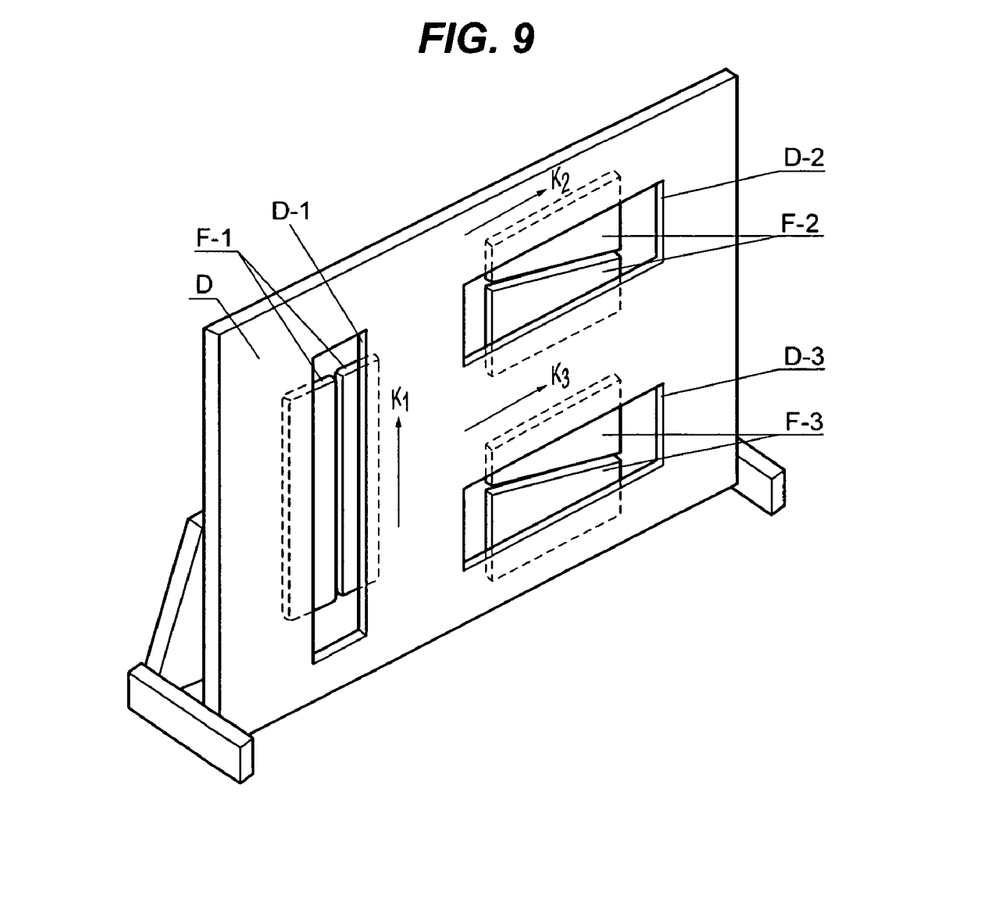
FIG. 9 is a perspective view of a jig used for fixing horizontal and vertical position welding samples and testing the control system of the present invention.

As shown in FIG. 9, an approximately 2 m×3 m steel plate D was erected up as a jig for an experiment, a long hole in vertical direction D-1 and two long holes in horizontal direction D-2 and D-3 are cut out in the steel plate D, then three tack welded samples are fixed in the opposite side of the three long holes, wherein the first sample F-1 formed a vertical welding seam, the second sample F-2 formed horizontal welding seam, the third sample F-3 formed a curved horizontal welding seam.

All three samples are made of low-carbon steel plates with a thickness of approximately 10-16 mm, the sample for vertical welding have an approximately 2×27.5 V-shaped groove and those for horizontal welding have an approximately 10+30 groove. On the back side of each sample a copper pad or other high-temperature resistant flexible pad is fixed.

Arrows $K_1$, $K_2$ and $K_3$ represent respectively the moving direction of the crawler 8 in the three cases.

The control process and equipment used in the welding are similar to those used in Example I.

Since steel plates with a medium thickness are to be welded, a multiple-pass welding process is used rather than one-pass process and therefore, the multiple passes must be arranged. While welding prior passes it is necessary to keep reference line for the following passes, one edge or two edges of the groove may be used as reference line.

In the horizontal and vertical welding process, to ensure the weld bead formation and quality of welding, different amplitude of weaving, frequency of weaving, pause of weaving and time of weaving are selected for the welding torch 15 to perform prescribed weaving via the weaving drive of welding torch.

III. Trial Production

The equipment of the present invention has been used in the welding of spherical tank with a diameter of approximately 7.5 meters on its central vertical plan. The precision of tracking was high. The weld bead formation was good. The weld quality was tested by NDT and fulfilled the technical requirement.

The control system for a trackless autonomous crawling all-position arc welding robot with wheels and permanent magnet caterpillar belts provided in the present invention has the advantages over normal industrial arc welding robot and track-type automatic welding machine of the prior art as follows: 1) it is able to perform the trackless autonomous crawling all-position welding of large or giant structures, including horizontal and vertical position welding as well as all-position welding, this cannot be done by the prior art articulated arc welding robot or track type crawling automatic arc welding machine; 2) since advanced system for welding seam identification and tracking as well as welding control is utilized, welding with high quality can be ensured, wherein the horizontal tracking precision of the welding seam can be up to about +0.2~0.3 mm and height tracking precision within ±0.5. Furthermore the range of tracking is not limited; 3) as there is no need of the installation of tracks or any type of guiding means, the subsidiary time in welding is obviously reduced and the welding is performed according to the optimal specifications all the time, thereby the defects and repair time in welding seams are reduced, the work efficiency is greatly promoted as well; 4) as the identification of the position and joint type of the welding seam is completely adaptive and autonomous with no need of programming, teaching or manual monitoring, the operational degree of difficulty is decreased and operators are thoroughly set free. The control system proposed in the present invention is suitable for use in the welding of large structures with high precision, high quality and high efficiency.

The examples depicted above are for illustration only, and not for limiting the present invention.

What is claimed is:

1. A control method for a trackless autonomous crawling all-position arc welding robot with wheels and permanent magnet caterpillar belts, said method comprising the steps of:
   timely detecting a position image signal of the a welding seam using a laser CCD sensor;
   transmitting said position image signal to a tracking controller after signal processing;
   sending out instructions by from the tracking controller upon receipt of said position image signal;
   moving a welding torch in one of a vertical and horizontal direction upon said instructions via a bi-directional driving mechanism and a cross slide; wherein said welding torch is fixed on said cross slide;
   when a horizontal slide shift signal is sent out as a horizontal slide of said cross slide moves, synthetically transmitting said image signal and said horizontal slide shift signal to a crawler drive controller via a programmable logic controller (PLC);
   said crawler drive controller sending out instructions to drive two permanent magnet caterpillar belts respectively and thereby drive and turn a crawler via an AC servomotor drive;
   said PLC coordinating said cross slide and said crawler in combined tracking control, and movements of said cross slide and said crawler enabling said welding torch to track the welding seam and ensuring alignment precision, without placing a track, performing teaching or programming.

2. The method of claim 1, further comprising:
   transmitting welding current and voltage feedback signals to a welding power supply controller, wherein the welding power supply controller adaptively controls a welding power supply upon receipt of the current and voltage feedback signals.

3. The method of claim 1, further comprising:
   sending out control signals from a weaving controller to select an amplitude of weaving, a frequency of weaving, pausing of the weaving and timing of the weaving of the welding torch and the control signals make the welding torch perform the weaving via a weaving drive of welding torch.

4. The method of claim 1, wherein, said PLC can coordinate welding power supply control, welding torch weaving control and welding program control, to adapt them to different welding positions and joint types of the work-piece.

5. The method of claim 1, further comprising:
   controlling welding parameters needing adjusting or manual intervening during the welding with a manual controller.

6. The method of claim 1, further comprising:
   controlling the one or more permanent caterpillar belts of the crawler by generating or removing magnetic force via a magnetic circuit switch; wherein the magnetic circuit switch is turned on during crawler operation, a magnet body generates magnetic lines passing through a work-piece, and wherein the a load carrying capacity of the crawler can be up to approximately 120 kg; and turning off the magnetic circuit switch when the crawler is not in operation so that no magnetic lines pass through the work-piece, thereby removing magnetic attraction to work-piece, and allowing the crawler to be easily removed from the work-piece.

7. The method of claim 1, further comprising:
   controlling a moving speed of the one or more permanent magnet caterpillar belts of the crawler by the crawler drive controller and the AC servomotor drive, and turning the crawler through the control of a difference between speeds of the one or more permanent magnet caterpillar belts and a turning and safety device engaged with the one or more permanent magnet caterpillar belts.

* * * * *